(12) United States Patent
Kasten

(10) Patent No.: US 6,918,467 B2
(45) Date of Patent: Jul. 19, 2005

(54) COUNTER-ROTATING BRAKE DISC FOR A MOTORCYCLE WHEEL ASSEMBLY

(76) Inventor: Robert Kasten, 15610 S. Pebble La., Ft. Myers, FL (US) 33912

( * ) Notice: Subject to any disclaimer, the term of this patent is extended or adjusted under 35 U.S.C. 154(b) by 0 days.

(21) Appl. No.: 10/626,334

(22) Filed: Jul. 24, 2003

(65) Prior Publication Data

US 2005/0016800 A1   Jan. 27, 2005

(51) Int. Cl.$^7$ ................................. B60T 1/06
(52) U.S. Cl. ................... 188/18 A; 301/110.5; 301/6.9
(58) Field of Search ............................ 188/18 A, 18 R, 188/24.11, 218 R, 218; 301/6.1, 6.8, 110.5, 301/105.1, 6.9; 180/219, 264; 280/88

(56) References Cited

U.S. PATENT DOCUMENTS

| | | |
|---|---|---|
| 3,858,692 A | 1/1975 | Luchier et al. |
| 3,971,457 A | 7/1976 | Campagnolo |
| 4,062,427 A | 12/1977 | Klaue |
| 4,082,307 A | 4/1978 | Tait |
| 4,712,806 A * | 12/1987 | Patrin ........................ 280/217 |
| 5,014,808 A | 5/1991 | Savard et al. |
| 5,390,757 A | 2/1995 | Smith |
| 5,732,798 A | 3/1998 | Toson |
| 6,360,838 B1 * | 3/2002 | Kulhavy ..................... 180/219 |

* cited by examiner

*Primary Examiner*—Robert A. Siconoli
*Assistant Examiner*—Devon Kramer
(74) *Attorney, Agent, or Firm*—McNair Law Firm, P.A.

(57) ABSTRACT

A motorcycle wheel assembly comprising a brake hub rotatably mounted to a wheel axel. A brake disc is affixed to the brake hub rotating with the brake hub. A tire hub is rotatably carried by the brake hub carrying a tire for contacting a road surface to rotate the tire hub. A transfer gear is disposed between the tire hub and the brake hub for interconnecting the brake hub and tire hub. A center gear is carried by the brake hub for engaging the transfer gear, and a ring gear is carried by the tire hub for engaging the transfer gear so that rotation of the tire hub causes the transfer gear to counter-rotate the brake hub. Accordingly, counter-rotation of the brake disc carried by the brake hub creates a counter-rotational gyroscopic force that cancels out the gyroscopic force created by rotation of the motorcycle tire and tire hub.

14 Claims, 3 Drawing Sheets

COUNTER-ROTATING BRAKE DISC FOR A MOTORCYCLE WHEEL ASSEMBLY

FIELD OF THE INVENTION

The present invention relates to motorcycles, and more particularly, to a wheel assembly having a counter-rotating brake disc that cancels out gyroscopic force created by rotation of the wheel.

BACKGROUND OF THE INVENTION

The wheels of a motorcycle, as with any rotating object, create gyroscopic force in proportion to the rate of speed at which the wheels are turning. This causes an increase in turning effort by a rider, as well as, adverse handling characteristics. In order to steer a motorcycle it must be leaned in the direction that the rider wishes to turn. When a motorcycle is leaned to one side in order to turn, the gyroscopic force of the front wheel resists the directional change. This resistance increases relative to speed. A motorcycle is a laterally unstable vehicle that steers the same at all speeds, which is to say that lateral force is equal to vertical force. Lateral force is measured by radius x rate, and vertical force is measured by gravitational relation to the lean angle of the motorcycle. When a motorcycle produces insufficient lateral force, it simply falls over, regardless of speed.

The gyroscopic force created by rotation of the wheels, and the front wheel in particular, produces a torque on the motorcycle that transfers at a 90° angle to the horizontal axis of the motorcycle, which is transferred through the handle bars to the rider. Therefore, in order for a rider to lean a motorcycle over for a turn, the rider must overcome the gyroscopic force of the wheels by twisting the handle bars with an amount of torque equal to the amount of torque generated by the wheels. Overcoming the gyroscopic forces leads to rider fatigue and numerous problems with control and performance. In particular, in racing situations where speeds are extremely fast and the gyroscopic force created by the rotation of the wheels is severe, the rider is forced to constantly fight the gyroscopic force to maintain control of the motorcycle.

In some instances, rapid changes in direction at racing speeds, irregular tire wear, or a small bump in the road can result in a violent shaking of the motorcycle. This violent shaking begins when the contact patch of the tires is misaligned with the direction the motorcycle is traveling. This in turn causes the motorcycle to change lean angle very rapidly, producing the shaking effect until the contact patch of the tires is realigned with the direction of the motorcycle. Stiffer motorcycle frames and components reduce the effect but cannot eliminated it because they do not address the cause, which is gyroscopic precession of the wheels.

While various improvements in braking systems, motorcycle frames, and suspensions are represented in the prior art, there is no device designed to cancel out gyroscopic force to improve safety and performance of the motorcycle.

Accordingly, it is an object of the present invention to provide a wheel assembly for a motorcycle that reduces or cancels out gyroscopic force created by rotation of the wheels.

It is another object of the present invention to counter-rotate a disc on the wheel assembly of the motorcycle to cancel out gyroscopic force created by rotation of the wheels, particularly the front wheel.

It is another object of the present invention to limit the amount of additional weight required to be added to a motorcycle to cancel out the gyroscopic force by counter-rotating the brake discs used to stop the motorcycle.

It is another object of the present invention to increase control, performance, and safety of a motorcycle while reducing rider fatigue by canceling out the gyroscopic force created by rotation of the wheels.

SUMMARY OF THE INVENTION

The above objectives are accomplished according to the present invention by providing a wheel assembly for a motorcycle comprising a wheel axel carried by the motorcycle, a brake hub rotatably carried by the wheel axel, a tire hub rotatably carried by the brake hub for carrying a tire, and the brake hub and the tire hub constructed and arranged to rotate in opposite directions about the wheel axel. Accordingly, rotation of the brake hub in a direction opposite of the tire hub rotation creates a counter-rotational gyroscopic force that cancels the gyroscopic force created by the tire hub rotating in the opposite direction.

In a preferred embodiment, a transfer gear is disposed between the brake hub and the tire hub for interconnecting the brake hub and the tire hub to cause the brake hub and tire hub to cooperate to rotate in opposite directions. The brake hub further includes a center gear engaging the transfer gear; and the tire hub further includes a ring gear engaging the transfer gear so that rotation of the tire hub in a first direction causes the ring gear to rotate the transfer gear, which causes the transfer gear to rotate the center gear of the brake hub to rotate the brake hub in a direction opposite to the first direction of the tire hub.

Advantageously, at least one brake disc is carried by the brake hub for rotating in the direction of the brake hub about the wheel axel to provide increased mass rotating in a direction opposite of the tire hub to increase a counter-rotational gyroscopic force to cancel the gyroscopic force created by rotation of the tire hub. The brake disc is operatively associated with a braking mechanism carried on the motorcycle for stopping rotation of the brake disc, and thereby the brake hub and the tire hub.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAIL DESCRIPTION OF A PREFERRED EMBODIMENT

Figure 1:
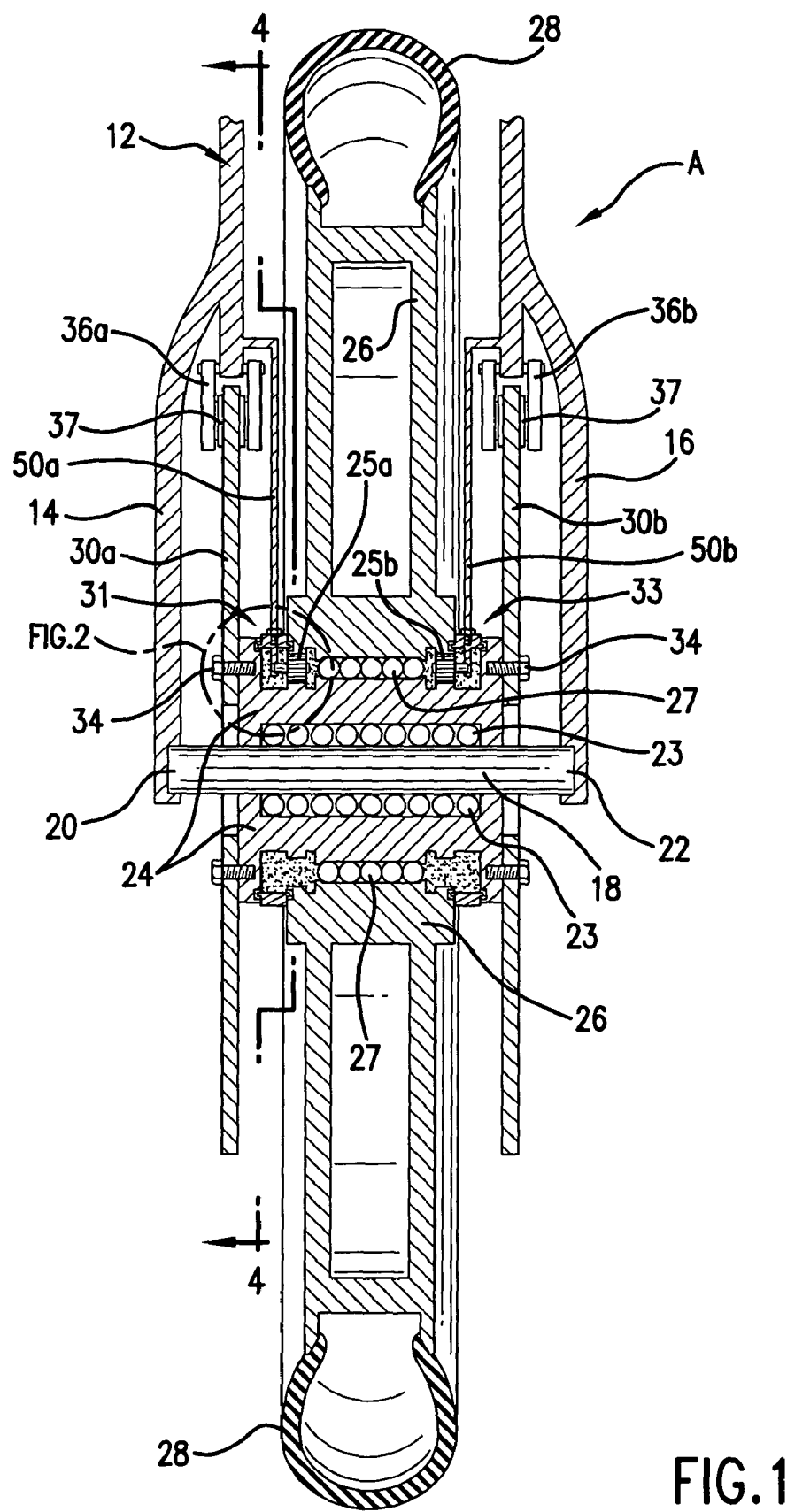
FIG. 1 shows a front cross-section view of the wheel assembly according to the invention.

In combination with reference to the drawings, the invention will now be described in more detail. Referring first to FIG. 1, a cross-section view of a wheel assembly, designated generally as A, is shown for the front wheel of a motorcycle.

As is commonly known to a person skilled in the art, a steering fork, designated generally as 12, carries the front wheel assembly on the motorcycle and allows a rider to turn the wheel and effect steering of the motorcycle.

As shown in FIG. 1, the steering fork includes a first prong 14 laterally spaced from a second prong 16, between which a wheel is carried on an axel for interacting with a road surface. The wheel assembly can generally be described to include a central wheel axel 18 having a first distal end 20 carried by first prong 14, and a second distal end 22 carried by second prong 16. A brake hub 24 is rotatably mounted to axel 18 so that the brake hub can spin about axel 18 until acted upon by braking means described herein in more detail below. A tire hub 26 for carrying a tire 28 is then rotatably mounted to brake hub 24. Brake hub 24 and tire hub 26 are interconnected by a rotational transfer means, shown as transfer gears 25a and 25b, cooperating with gear means carried by the brake hub and tire hub which force the hubs to spin in opposite directions to each other around axel 18. However, it should be noted that various gear arrangements commonly known to those skilled in that art may alternatively be utilized to produce the counter-rotation of the brake hub and tire hub without departing from the spirit and scope of the present invention.

In the construction and arrangement of the wheel assembly shown in FIG. 1, the braking means of the wheel assembly includes a first brake disc 30a carried on a first side, designated generally as 31, of brake hub 24 using attachment members 34, shown as a screw, or other commonly known attachment means. A second brake disc 30b is preferably affixed to a second side, designated generally as 33, of brake hub 24 also using attachment members 34. Accordingly, the brake means also includes braking mechanisms 36a and 36b. Preferably, braking mechanisms 36a and 36b are hydraulic brake calipers, commonly known to those persons skilled in the art, which force brake pads 37 against brake discs 30a and 30b to slow and stop rotation of the brake disc and brake hub 24, and thereby tire hub 26, which is interconnected to the brake hub by transfer gears 25a and 25b.

Counter-rotation of the brake hub and brake discs caused by transfer gears 25a and 25b creates a counter-rotational gyroscopic force due to the mass of the brake hub and brake discs. This counter-rotational gyroscopic force cancels out the gyroscopic force produced by the normal rotation of tire hub 26 and tire 28. Advantageously, the diameters of transfer gears 25a and 25b and brake discs 30a and 30b can be adjusted to provided varying degrees of counter-rotational gyroscopic force to reduce and eliminate the gyroscopic force produced by the rotation of tire hub 26 and tire 28. By adjusting the weight, diameter, thickness, etc., of the portions of brake hub 24, brake discs 30a and 30b, tire hub 26 and tire 28, the motorcycle can be tuned to a riders desired counter-rotational gyroscopic force preferences for any given type of riding conditions.

As a result, with the gyroscopic forces of the wheel assembly reduced or even eliminated, the rider can lean the motorcycle into a turn with less resistance and more control. Since the gyroscopic forces of the wheels are the primary resistance factor to adjusting the attitude of the motorcycle for turning at high speeds, a motorcycle equipped with counter-rotation brake hub 24 and brake discs 30a and 30b can cancel out gyroscopic forces on the wheel assembly, making it substantially easier to turn and control the motorcycle when the rider changes the lean angle. The present invention also has the effect of substantially reducing and even eliminating violent steering fork shake. As noted above, steering fork shake begins when the front tire of the motorcycle becomes misaligned with the forward direction of the motorcycle and attempts to correct itself due to gyroscopic force. The gyroscopic forces of the wheel attempt to bring the wheel back into alignment, causing a wiggle movement that can produce violent shaking at high speeds. The shaking results in a gyroscopic precession of the forces that causes the wiggle movement of the wheel assembly to travel along the horizontal axis of the motorcycle from the front wheel to the rear wheel, producing an uncontrollably dangerous condition for the rider. By counter-rotating the brake hub as described herein to cancel the gyroscopic forces before they can produce the gyroscopic precession, the problem of violent steering fork shaking is eliminated and the safety of the rider increased. The lack of gyroscopic force reduces rider fatigue caused by having to overcome the torque created by the gyroscopic forces of tire hub 26 and tire 28 when turning the motorcycle, leading to overall better performance and control that contributes to safer and faster operation of the motorcycle.

Figure 3:
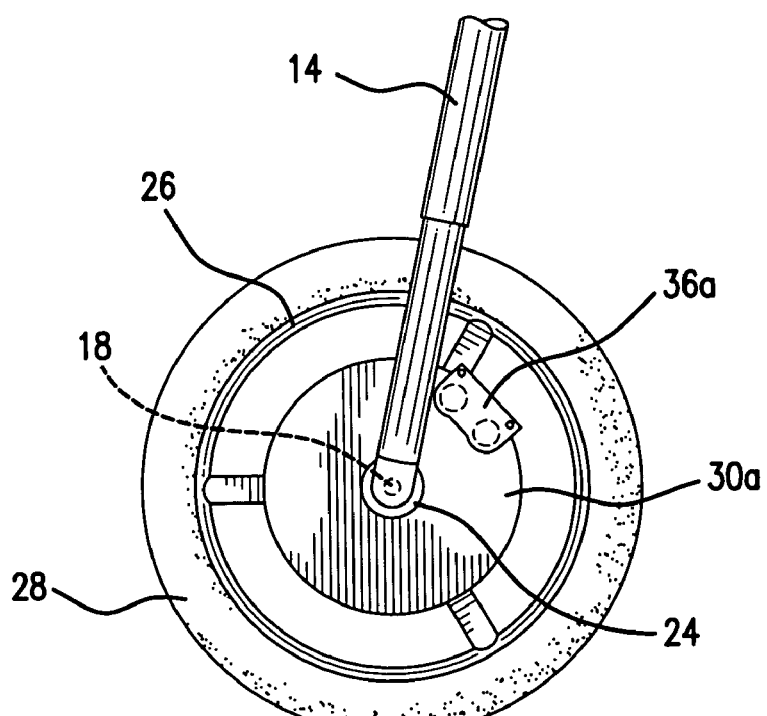
FIG. 3 shows a side view of the wheel assembly according to the invention.

Typically, the diameter of brake discs are kept as small as possible to limit gyroscopic forces as much as possible when spinning in the same direction as the tire hub. Referring to FIGS. 1 and 3, with the present invention, brake discs 30a and 30b can be made considerably larger since they spin in the opposite direction of tire hub 26 and tire 28. Advantageously, larger brake discs have greater stopping power and more counter-rotational gyroscopic force to cancel out the gyroscopic force of the tire hub and tire. Additionally, brake discs 30a and 30b can also be constructed and arranged to spin faster than tire hub 26 and tire 28 by adjusting the diameter of transfer gears 25a and 25b. Faster rotation of the brake discs results in increased friction between brake mechanisms 36a and 36b and brake discs 30a and 30b, leading to a better brake feel for the rider and quicker stopping power.

Figure 2:
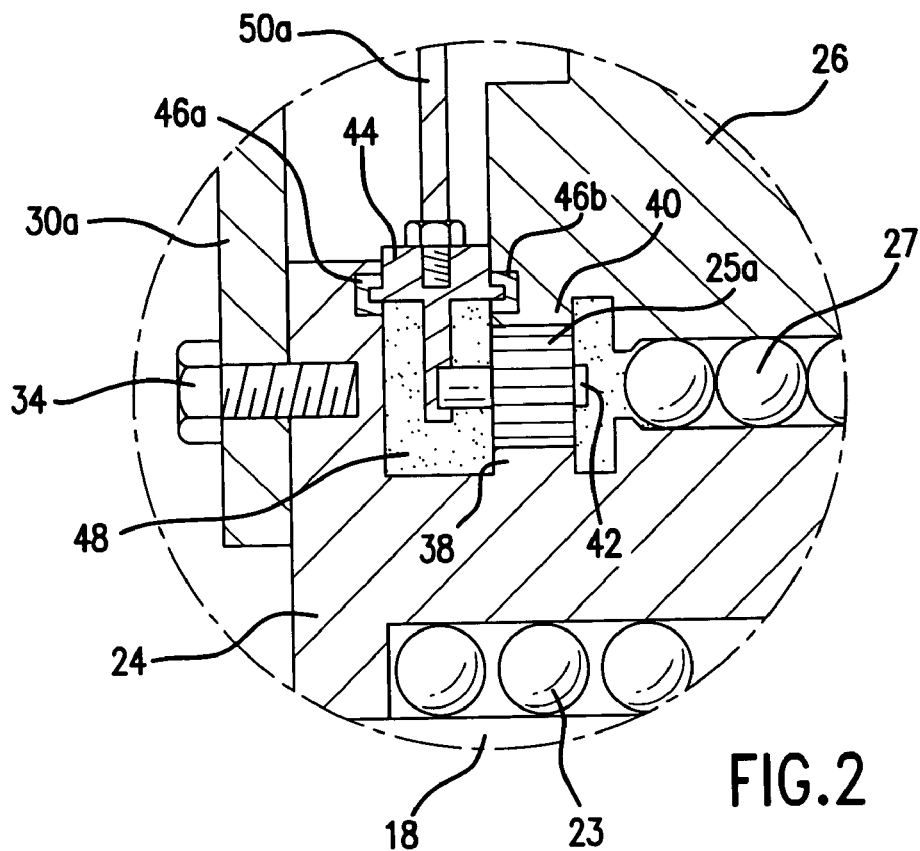
FIG. 2 shows a detailed cross-section view of the interconnection between the brake hub and tire hub according to the invention.
Figure 4:
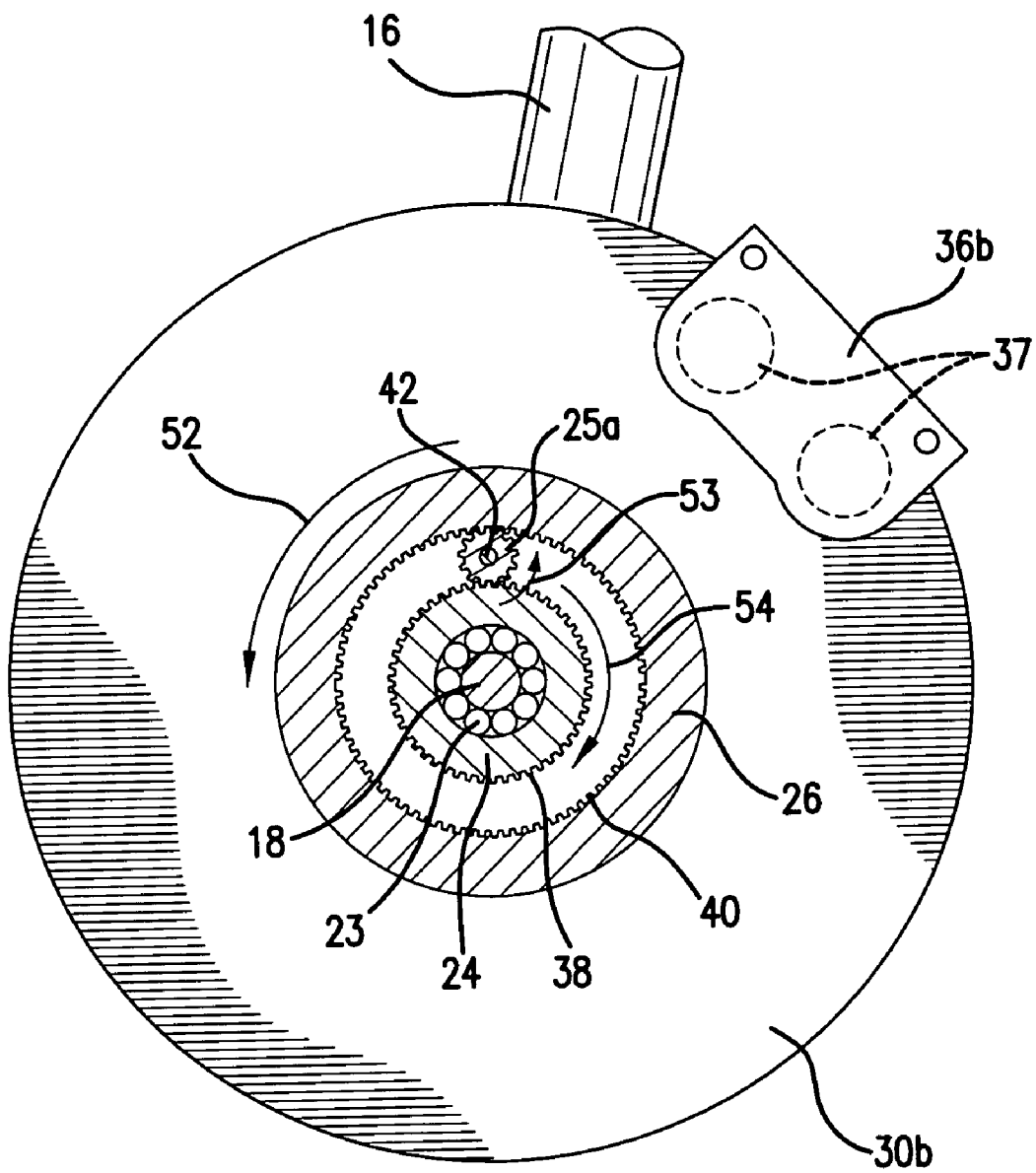
FIG. 4 shows a side cross-section view of the wheel assembly illustrating the rotational direction of the brake hub and tire hub according to the invention.

Referring to FIGS. 2 and 4, brake hub 24 is rotatably mounted to axel 18 on brake hub bearings 23 to reduce friction and allow the brake hub to spin easily around axel 18. Brake discs 30a and 30b are affixed to brake hub 24 by attachment member 34 so that rotation of the brake hub causes rotation of the brake discs. Tire hub 26 is carried circumferentially around brake hub 24 on tire hub bearings 27 to allow tire hub 26 to spin in direction 52, while brake hub 24 is forced to spin in opposite direction 54. To force tire hub 26 and brake hub 24 to rotate in opposite directions, transfer gears 25a and 25b are disposed between the tire hub and brake hub, interconnecting a portion of the tire hub with a portion of the brake hub. As shown in FIG. 4, as tire hub 24 is rotated in direction 52, transfer gears 25a and 25b are forced to rotate in direction 53, which in turn causes brake hub 24 to rotate in direction 54.

To cooperate with transfer gears 25a and 25b, brake hub 24 includes center gear 38 which engages the transfer gears. Tire hub 26 includes ring gear 40 for engaging the transfer gears. Accordingly, as tire hub 26 is rotated in direction 52 by the interaction of tire 28 on a road surface, the gear teeth of ring gear 40 cooperate with complementary gear teeth of transfer gears 25a and 25b to cause rotation of the transfer gear in the same direction as tire hub 26. As a result, the gear teeth of center gear 38 are forced to cooperate with complementary gear teeth of transfer gears 25a and 25b to cause rotation of brake hub 24 in opposite direction 54 of tire hub 26 and transfer gears 25a and 25b.

Referring to FIG. 2, to ensure the counter-rotation of brake hub 24, transfer gears 25a and 25b must be fixed in position between tire hub 26 and brake hub 24. Accordingly, transfer gears 25a and 25b are mounted on transfer gear axel 42. Transfer gear axel 42 is carried by seal member 44. Seal member 44 engages seal bushing 46a carried by brake hub 24 and seal bushing 46b carried by tire hub 26. Seal member 44 and seal bushings 46a and 46b cooperate to ensure lubricant 48 is maintained around transfer gears 25a and 25b and disposed between brake hub 24 and tire hub 26. As seal bushings 46a and 46b rotate with their respective hubs, seal member 44 must be affixed in place to ensure that transfer gear axel 42 maintains transfer gears 25a and 25b in a fixed position. Accordingly, referring to FIGS. 1 and 2, stationary arm members 50a and 50b extend downward from steering fork 12 to engage seal member 44 and hold the seal member in a fixed position as tire hub 26 and brake hub 24 are rotated in opposite directions.

It should be noted that the present invention may also be adapted to work with the rear wheel of the motorcycle by connecting the drive mechanism to either brake hub 24 or tire hub 26.

While a preferred embodiment of the invention has been described using specific terms, such description is for illustrative purposes only, and it is to be understood that changes and variations may be made without departing from the spirit or scope of the following claims.

What is claimed is:

1. A wheel assembly for a motorcycle, said wheel assembly comprising:
   a wheel axle carried by said motorcycle;
   a brake hub rotatably carried by said wheel axle;
   a tire hub rotatably carried by said brake hub for carrying a tire; and
   said brake hub and said tire hub constructed and arranged to rotate in opposite directions about said wheel axle;
   whereby, rotation of the brake hub in a direction opposite of said tire hub rotation creates a counter-rotational gyroscopic force that cancels the gyroscopic force created by the tire hub rotating in the opposite direction.

2. The wheel assembly of claim 1 including a transfer gear disposed between said brake hub and said tire hub for interconnecting said brake hub and said tire hub to cause said brake hub and tire hub to cooperate to rotate in opposite directions.

3. The wheel assembly of claim 2 wherein said brake hub includes a center gear engaging said transfer gear; and said tire hub including a ring gear engaging said transfer gear so that rotation of said tire hub in a first direction causes said ring gear to rotate said transfer gear, which causes said transfer gear to rotate said center gear of said brake hub to rotate said brake hub in a direction opposite to said first direction of said tire hub.

4. The wheel assembly of claim 1 including at least one brake disc carried by said brake hub for rotating in the direction of said brake hub about said wheel axle to provide increased mass rotating in a direction opposite of said tire hub to increase a counter-rotational gyroscopic force to cancel the gyroscopic force created by rotation of the tire hub.

5. The wheel assembly of claim 2 wherein said brake disc is operatively associated with a braking mechanism carried on said motorcycle for stopping rotation of said brake disc and thereby said brake hub and said tire hub.

6. A wheel assembly for the front wheel of a motorcycle having a front steering fork carrying a wheel axle, said wheel assembly comprising:
   a brake hub rotatably mounted to said axel;
   a brake disc carried by said brake hub for rotating in the direction of said brake hub;
   a braking mechanism for engaging said brake disc to stop rotation of said brake hub;
   a tire hub rotatably carried by said brake hub for carrying a tire; and
   a transfer gear interconnecting said brake hub and said tire hub so that rotation of said tire hub in a first direction causes said transfer gear to counter-rotate said brake hub in an opposite direction to said tire hub;
   whereby counter-rotation of the brake disc carried by the brake hub creates a counter-rotational gyroscopic force which cancels out the gyroscopic force created by rotation of the tire and tire hub in the first direction.

7. The wheel assembly of claim 6 wherein said brake hub includes a center gear, and said tire hub including a ring gear; said transfer gear disposed between said center gear and said ring gear for cooperating with said center gear and said ring gear to cause said brake hub to rotate in a direction opposite of said tire hub when said tire hub is rotated.

8. The wheel assembly of claim 7 including a first brake disc mounted to a first side of said brake hub, and a second brake disc mounted to a second side of said brake hub; said first and second brake discs providing increased mass rotating together with said brake hub in a direction opposite of said tire hub to increase said counter-rotational gyroscopic force to cancel the gyroscopic force created by rotation of the tire hub.

9. In combination, a wheel assembly and a motorcycle, said wheel assembly comprising:
   a steering fork carried by said motorcycle having a first prong laterally spaced from a second prong;
   an axle having a first distal end carried by said first prong, and a second distal end carried by said second prong;
   a brake hub rotatably mounted to said axel having a plurality of brake hub bearings disposed between said axle and said brake hub to promote rotation;
   a brake disc affixed to said brake hub rotating with said brake hub;
   a braking mechanism carried by said steering fork for engaging said brake disc and stopping rotation of said brake disc and said brake hub;
   a tire hub rotatably carried by said brake hub having a plurality of tire hub bearings disposed between said brake hub and said tire hub to promote rotation;
   a tire carried by said tire hub for contacting a road surface to rotate said tire hub;
   a transfer gear disposed between said tire hub and said brake hub for interconnecting said brake hub and tire hub;
   a center gear carried by said brake hub for engaging said transfer gear, and a ring gear carried by said tire hub for engaging said transfer gear so that rotation of said tire hub caused said transfer gear to counter-rotate said brake hub;
   whereby, counter-rotation of the brake disc carried by said brake hub creates a counter-rotational gyroscopic force that cancels out the gyroscopic force created by rotation of the motorcycle tire and tire hub.

10. The wheel assembly of claim 9 wherein said braking mechanism includes a brake caliper fixedly mounted to said steering fork; said brake caliper operatively associated with said brake disc for stopping rotation of said brake disc and thereby said brake hub and said tire hub.

11. The wheel assembly of claim 9 including a first brake disc mounted to a first side of said brake hub, and a second brake disc mounted to a second side of said brake hub to provide increased mass rotating in a direction opposite of said tire hub to increase said counter-rotational gyroscopic force to cancel the gyroscopic force created by rotation of the tire hub.

12. A wheel assembly for the front wheel of a motorcycle having a front steering fork carrying a wheel axle, said wheel assembly comprising:
   brake hub means rotatably mounted to said axle;
   tire hub means rotatably mounted to said brake hub means for carrying a tire; and
   rotational transfer means operatively associated with said brake hub means and said tire hub means for causing said brake hub means to spin in a counter-rotational direction to said tire hub means;
   whereby counter-rotation of the brake hub means cancels out gyroscopic forces created by rotation of said tire hub means.

13. The wheel assembly of claim 12 including braking means operatively associated with said brake hub means for stopping rotation of said brake hub means.

14. The wheel assembly of claim 12 including gear means carried by said tire hub and said brake hub for cooperating with said rotational transfer means to rotate said brake hub in a direction opposite from said tire hub.

* * * * *